United States Patent [19]

Fukuta et al.

[11] Patent Number: 4,798,615
[45] Date of Patent: Jan. 17, 1989

[54] PROCESS FOR MAKING A FILTER FOR MOLTEN METAL HAVING A HIGH MELTING POINT

[75] Inventors: Shigemi Fukuta, Osaka; Toshinari Amakasu; Ken Ugata, both of Nara; Shoichi Yoshino, Osaka, all of Japan

[73] Assignee: Kubota Ltd., Osaka, Japan

[21] Appl. No.: 919,962

[22] Filed: Oct. 17, 1986

[30] Foreign Application Priority Data

Oct. 19, 1985 [JP] Japan .................... 60-235032
Feb. 10, 1986 [JP] Japan .................... 61-18618[U]
Apr. 14, 1986 [JP] Japan .................... 61-56445[U]

[51] Int. Cl.$^4$ ................ B01D 29/36; D03D 15/04
[52] U.S. Cl. ................ 65/4.4; 210/500.26; 210/508; 210/510.1; 164/358; 55/523
[58] Field of Search ............ 210/500.26, 508, 509, 210/510.1; 55/522, 523, 524, 527, D45, D5; 65/2, 4.4; 164/358; 501/2, 32, 54, 55, 80, 133

[56] References Cited

U.S. PATENT DOCUMENTS

| | | | |
|---|---|---|---|
| 2,278,207 | 3/1942 | Matheas | 210/509 |
| 3,600,147 | 8/1971 | McKinnis et al. | 210/500.26 |
| 3,972,694 | 8/1976 | Head | 210/509 |
| 4,007,114 | 2/1977 | Ostreicher | 210/509 |
| 4,258,098 | 3/1981 | Bondoc et al. | 65/4.4 |
| 4,510,253 | 4/1985 | Felice et al. | 210/510.1 |
| 4,613,350 | 9/1986 | Forester et al. | 65/2 |

Primary Examiner—Richard V. Fisher
Assistant Examiner—Wanda L. Millard
Attorney, Agent, or Firm—Armstrong, Nikaido Marmelstein & Kubovcik

[57] ABSTRACT

A filter for molten metal having a high melting point is in the form of a net woven of glass yarns formed by twisting a multiplicity of glass fibers together. The glass fibers contain at least 75 wt. % of $SiO_2$ and are thermally cured at a thermal shrinkage of 2.5 to 15%. The thermal shrinkage is expressed by $(1-1')/1 \times 100$ % wherein $1$ is the length of the fiber before the thermal cure, and $1'$ is the length of the fiber as thermally cured.

4 Claims, 4 Drawing Sheets

PROCESS FOR MAKING A FILTER FOR MOLTEN METAL HAVING A HIGH MELTING POINT

FIELD OF INDUSTRIAL APPLICATION

The present invention relates to a netlike filter of glass fiber for filtering a melt of metal, such as cast iron or cast steel, having a high melting point.

PRIOR ART

When slag suspended in a melt of iron, such as cast iron or cast steel, flows into the mold cavity along with the melt, the slag rises to the surface of the molten metal and solidifies, forming an aggregate of slag particles beneath the black skin of the casting as a defect.

Accordingly, the runner is generally provided with means for preventing slag from entering the mold cavity.

To provide such means, it is common practice to increase the height and length of the runner to float slag in the runner extending from the sprue to the mold cavity for separation. This method, however, is not desirable since the sprue, gate, riser and other portions become complex in construction, resulting in a lower yield and an increased production cost.

Accordingly, an earthen strainer, or a foamed or honeycomb ceramics filter is used in the sprue, runner or like channel for removing slag without lengthening the runner, but these means, although costly, are low in filtration efficiency, brittle and therefore susceptible to damage. Furthermore, when such a filter is to be used, a recessed portion for installing the filter must be formed in the sprue, runner or like channel, hence the drawback of an increased pattern cost for shaping the recessed portion.

On the other hand, netlike filters of carbon fiber or glass fiber are used for molten metals having a low melting point, such as aluminum, whereas these filters are not usable for molten iron-type metals havnng a high melting point of 1200° to 1750° C.

SUMMARY OF THE INVENTION

An object of the present invention is to provide a filter usable for molten metals having a high melting point and a process for producing the filter by forming a net of glass fibers containing at least 75 wt. % of $SiO_2$ and pre-shrinking the net by thermal cure.

Another object of the present invention is to provide a filter assembly comprising a filter of the type described and members made of a pattern material to be lost, fittable in a sprue or runner and holding the central portion of the filter therebetween, with the outer periphery of the filter projecting from the members.

Another object of the present invention is to provide a filter assembly comprising a circular filter having a flange formed by bending the outer periphery of the filter toward the front or rear side of the filter, and an annular holding member having an inwardly projecting annular stepped portion and a retaining ring holding the filter therebetween, the bent flange extending along the inner peripheral surface of the upper portion of the holding member, the circular bottom edge portion of the filter extending along the annular stepped portion.

DESCRIPTION OF THE PREFERRED EMBODIMENTS

The present invention will be described below with reference to the drawings showing several embodiments.

Figure 1:
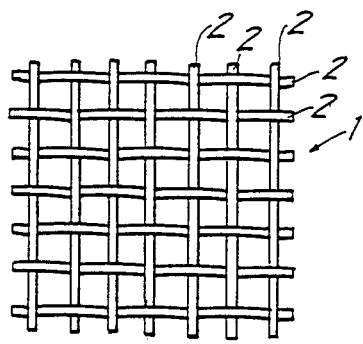
FIG. 1 is a plane view showing a netlike filter.

FIG. 1 shows an embodiment of netlike filter 1 of the present invention.

The filter 1 is prepared by longitudinally and latitudinally weaving yarns 2 of a multiplicity of glass fibers into a net. The filter 1 need not always be quadrilateral but can be of circular or any other desired shape.

The fiber is about 9 μm in diameter. Several hundred fibers are bundled and twisted into a yarn. Several yarns are used as a set, and several sets of yarns are bundled and further twisted together. For example, five yarns, each composed of 400 fibers, are used as a set, and three such sets are made into a string-like member (composed of 6000 fibers).

Preferably, the netlike filter is 0.4 to 1 $mm^2$ in mesh size. If the size is less than 0.4 $mm^2$, molten metal will encounter great resistance when passing through the filter and will not flow therethrough smoothly, whereas if it is over 4 $mm^2$, the filter fails to remove slag or the like effectively. Preferably, the netlike filter is 1 to 4 mm in thickness since if it is less than 1 mm in thickness, the filter will be deformed by the molten metal passing therethrough. Further when the filter has a suitable thickness, the casting obtained is readily removable from the filter portion of the mold, whereas this advantage will not be available when the thickness exceeds 4 mm.

The netlike filter contains at least 75 wt. % of $SiO_2$ and is prepared by being thermally cured at a thermal shrinkage of 2.5 to 15%.

The thermal shrinkage is expressed by $(1-1')/1 \times 100$ (%) wherein 1 is the length of the fiber before thermal cure and 1' is the length of the fiber as thermally cured.

The $SiO_2$ content should be at least 75 wt. % to give the filter improved heat resistance and render the filter usable for molten cast iron or steel of any kind. Furthermore the filter is thermally cured and thereby shrunk before use to avoid the problem that the filter, when uncured, shrinks on heating, permitting the filter installed portion of the mold to release some molding sand into the molten metal.

More specifically, the $SiO_2$ content of the filter should be at least 75 wt. % for the following reason.

Directing attention to the heat resistance improving effect of $SiO_2$, we prepared glass fibers having varying $SiO_2$ contents, dipped the fibers in hot molten metal for 20 seconds and thereafter checked the fibers for deterioration.

Figure 2:
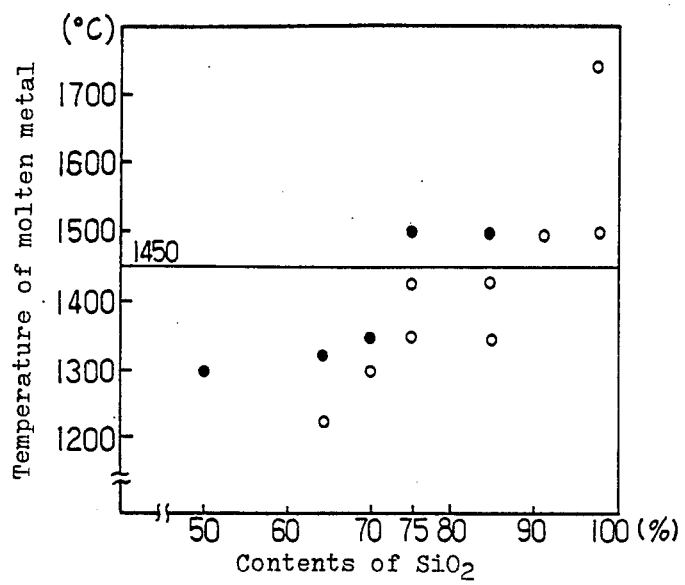
FIG. 2 is a graph showing the relation between the temperature of molten metal and the $SiO_2$ content of glass fiber.

The result of the experiment is shown in FIG. 2 in which the blank mark represents a specimen free from any marked change, and the solid mark a specimen partly melted and converted into slag. As the molten metal, cast iron is used at a temperature of 1200° to 1450° C., or cast steel at a temperature of 1450° to 1750° C. FIG. 2 shows that the filter containing 70 wt. % of $SiO_2$ is converted to slag and becomes unusable when dipped in molten metal at 1350° C. for 20 seconds, further revealing that to be useful for the melt of any kind of cast iron, the filter must contain not less than 75 wt. % of $SiO_2$. It is also seen that the filter for molten cast steel should contain at least 90 wt. % of $SiO_2$.

The $SiO_2$ content of glass fiber can be increased by treating the glass fiber with an acid. More specifically, the glass fiber, which is composed chiefly of silica, is immersed in an acid solution, for example, of hydrochloric acid, nitric acid, sulfuric acid or the like to lower the contents of other components of the glass fiber, such as CaO, MgO, $Fe_2O_3$, $Cr_2O_3$, $Na_2O$, $K_2O$, $TiO_2$ and $B_2O_3$, to increase the $SiO_2$ content consequently. For example, the filter in the form of a woven net is immersed in a 10% hydrochloric acid solution heated at 70 to 90° C., for about 2 hours. To promote the reaction, it is desirable to add a catalyst, such as hexamethylenetetramine, to the acid solution. Experiments conducted under varying conditions have revealed that an increased $SiO_2$ content of 99.9 wt. % is achievable by this treatment, while the upper limit of the content is about 99.5 wt. % for commercial operation. Although long fibers of silica can be subjected to the acid treatment before being woven into a net, it is desirable to acidtreat the woven net in view of the operation efficiency and the strength of fiber to be impaired by the increased amount of $SiO_2$.

The thermal curing treatment is conducted for the following reason.

The acid-treated glass fiber has many pores. When hot molten metal passes through the filter, these pores contract, consequently shrinking the filter. Since the filter is installed at the parting plane of the mold, the shrinkage, if great, collapses the filter holding portion of molding sand, permitting grains of sand to fall into the molten metal and lodge in the resulting casting as a defect. It is therefore desirable to diminish the thermal shrinkage of the filter to the greatest possible extent.

For this purpose, the filter of the present invention is pre-shrunk by thermal cure since the shrinkage of the filter, which is due to the passage of hot molten metal and dependent on the temperature of the molten metal, can be reduced by an amount corresponding to the shrinkage effected by the thermal cure before use. Accordingly, the greater the thermal shrinkage achieved by the thermal cure, the smaller is the shrinkage of the filter during use.

While the thermal shrinkage can be made greater when the filter is thermally cured at a higher temperature for a longer period of time, the filter is satisfactorily serviceable when the thermal shrinkage is 2.5 to 15% in view of the shrinkage due to the heat of molten metal when glass fibers are used as a filter. The desired shrinkage can be achieved by curing the filter at 800° C. for 30 minutes to 1100° C. for about 5 to about 10 minutes. It is desirable that the curing temperature be up to 1100° C. since glass fibers undergo cristobalite transformation and become brittle if the curing temperature exceeds 1100° C.

The filter which is prepared by weaving threads of a multiplicity of glass fibers into a net is unable to retain a definite shape under gravity, so that it is desirable to use the filter as held in place with resin or sand at its outer periphery or as supported by a metal wire. When an acid or neutral binder is applied to the fibers, the netlike filter is given improved rigidity against bending so as to retain a given shape. For example, the netlike filter may be coated with an acid novolak-type phenolic resin, neutral phenolic resin, starch glue, acid silica sol solution or the like and thereafter dried at about 150° C. for about 20 minutes. The acid or neutral binder is desirable since an alkali would impair the strength of the fibers or lower the $SiO_2$ content.

Next, examples are given below in which filters according to the invention were used for casting stepped round bars and stepped test pieces. For comparison, conventional filters were also used for casting like bars and test pieces.

EXAMPLE FOR CASTING STEPPED ROUND BARS

Table 1 shows the filters used. The molten metal used was ductile cast iron having the following composition.

3.3–3.9% C, up to 0.1% P, 2.0–2.7% Si, up to 0.01% S, 0.2–0.45% Mn, 0.025–0.050% Mg and the balance substantially Fe.

Figure 3:
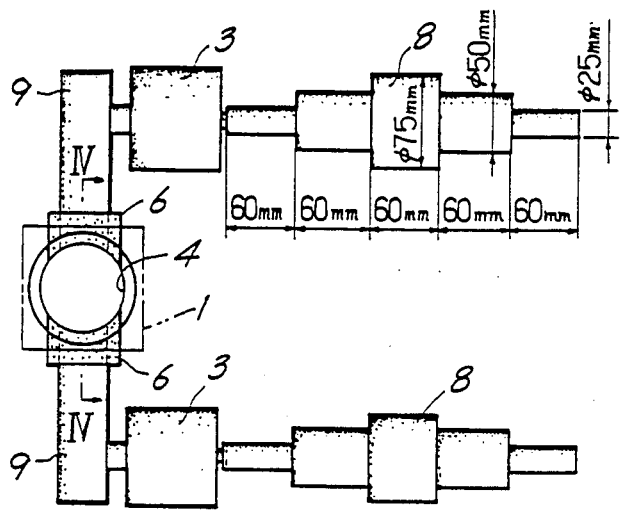
FIG. 3 is a plane view showing a gating system for casting stepped round bars.
Figure 4:
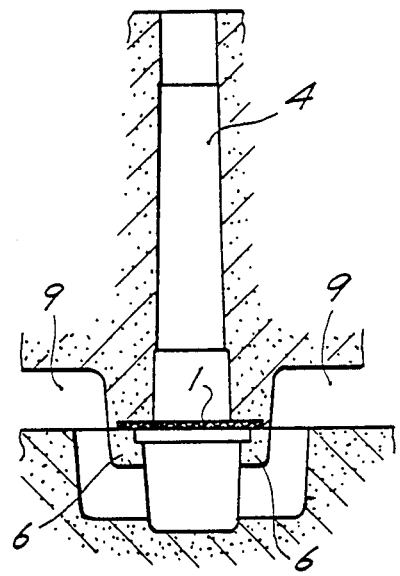
FIG. 4 is a view in section taken along the line IV—IV in FIG. 3.

FIGS. 3 and 4 show the gating system used. With reference to these drawings, the system has mold cavities 8 for casting stepped round bars, runners 9, risers 3, a sprue 4, the filter 1, and a core 6 for setting the filter. FIG. 3 also shows the dimensions of the cavity 8. The casting temperature was 1400° C., and the casting time 10 seconds.

The filters of the present invention (sample Nos. 1–3) were thermally cured at 900° C. for 30 minutes to achieve a shrinkage of 3%. A binder for giving shape retentivity was applied to these filters. As the binder, an acid novolak-type phenolic resin, 1 to 2 in pH, was used for samples No. 1 and No. 2, or a neutral phenolic resin, 7.2 in pH, was used for sample No. 3.

TABLE 1

| Sample No. | Filter type | Thickness (mm) | Opening size (mm) | Composition (wt. %) |
|---|---|---|---|---|
| 1 | Glass fiber net | 1.5 | 1.5 × 2.0 | See Table 2. |
| 2 | Glass fiber net | " | 1.5 × 1.0 | " |
| 3 | Glass fiber net | " | 1.5 × 2.0 | " |
| 4 | Ceramics honeycomb | 8 | 1.5 × 1.5 | 3% 2MgO, 62% 5SiO$_2$ 35% 2Al$_2$O$_3$ |
| 5 | Ceramics honeycomb | 20 | See Note 1. | SiC |
| 6 | Porous earthen | 10 | 10 in diam. Porosity 28% | — |

TABLE 1-continued

| Sample No. | Filter type | Thickness (mm) | Opening size (mm) | Composition (wt. %) |
|---|---|---|---|---|
| | strainer | | | |

Note 1:
Three-dimensional netlike skeletal structure having 8 to 13 open cells/inch and a void volume of 85 to 90%.

$$\text{Void volume (\%)} = \left(1 - \frac{\text{Apparent specific gravity}}{\text{Specific gravity of skeleton}}\right) \times 100$$

TABLE 2

| Sample No. | SiO$_2$ | Al$_2$O$_3$ | CaO | MgO | Fe$_2$O$_3$ | Cr$_2$O$_3$ | Na$_2$O | K$_2$O | TiO$_2$ | B$_2$O$_3$ |
|---|---|---|---|---|---|---|---|---|---|---|
| 1 | 98.0 | ≦0.2 | ≦0.05 | ≦0.2 | ≦0.2 | — | — | — | — | ≦0.2 |
| 2 | 98.9 | 0.44 | 0.07 | 0.01 | 0.01 | — | 0.02 | 0.01 | 0.36 | — |
| 3 | 96.1 | 3.2 | 0.094 | 0.03 | 0.06 | ≦0.002 | 0.40 | 0.02 | — | — |

Note:
The unit is wt. %.

A 1.5-mm-thick portion of each of the cast stepped round bars was removed by cutting, and the resulting surface of the bar was examined by color check, i.e. by adding a pigment to a highly permeating solvent, applying the mixture to the original surface of the bar and counting with the unaided eye the number of color spots not smaller than 3 mm in diameter and formed on the cut surface by the penetration of the mixture through cracks.

Table 3 shows the criterion for the numbers of color spots found in the checked portions of the bars.

TABLE 3

| Valuation | 25 mm (diam.) × (60 + 60) mm (pieces) | 50 mm (diam.) × (60 + 60) mm (pieces) | 75 mm (diam.) × 60 mm (pieces) |
|---|---|---|---|
| A rank | 0 | 0 | 0 |
| B rank | 1-2 | 1-2 | 1-3 |
| C rank | 3-5 | 3-7 | 4-9 |
| D rank | 6-9 | 8-11 | 10-14 |
| E rank | 10-19 | 12-19 | 15-19 |
| F rank | ≧20 | ≧20 | ≧20 |

Samples were evaluated in Table 4, by taking an average at each stepped portion.

TABLE 4

| Specimen Nos. | 1 | 2 | 3 | 4 | 5 | 6 |
|---|---|---|---|---|---|---|
| Valuation | B rank | B rank | A rank | D rank | C rank | E rank |

The result indicates that the filters of the present invention are superior to the conventional filters in filtration effect and are useful for precluding defects in castings such as inclusion of sand.

EXAMPLE FOR CASTING STEPPED TEST PIECES

Figure 5:
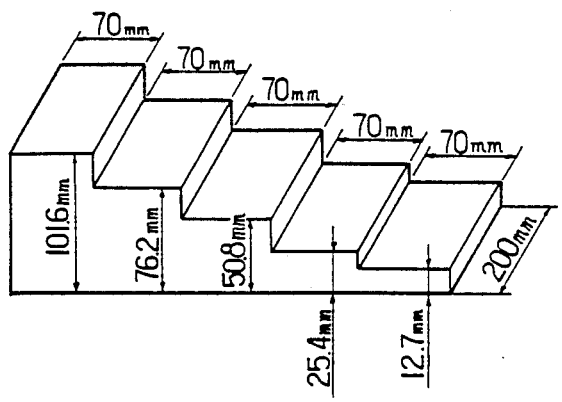
FIG. 5 is a perspective view showing a stepped test piece.

Stepped test pieces were cast in the same manner as in the foregoing example. FIG. 5 shows the shape and dimensions of the test piece obtained. Each of the test pieces was checked for color spots in the same manner as above, and the surface was cut until all the color spots disappeared to determine the depth of the defective layer. Table 5 shows the result. Each value listed is the thickness, in mm, of the surface layer thus removed from the specified portion of the test piece, as measured from the surface of the black skin of the piece.

TABLE 5

| Sample No. | Thickness of test piece | | | | |
|---|---|---|---|---|---|
| | 12.7 mm (½ in.) | 25.4 mm (1 in.) | 50.8 mm (2 in.) | 76.2 mm (3 in.) | 101.6 mm (4 in.) |
| 1 | 2.0 | 2.0 | 2.0 | 2.0 | 2.0 |
| 2 | 2.0 | 2.0 | 2.0 | 2.0 | 2.5 |
| 3 | 1.5 | 1.5 | 1.5 | 1.5 | 1.5 |
| 4 | 2.5 | 3.5 | 3.5 | 3.5 | 4.0 |
| 5 | 2.5 | 3.0 | 3.0 | 3.0 | 3.5 |
| 6 | 2.5 | 4.5 | 4.0 | 4.0 | 3.5 |

Table 5 reveals that the casting obtained with use of the filter of the present invention can be made almost entirely free from detects when the surface portion thereof is removed to a thickness of up to 2 mm irrespective of the thickness of the casting. On the other hand, in the case of the castings obtained using the conventional filters, the depth of the defective layer tends to increase with an increase in the thickness of the casting. Evidently, therefore, the conventional filters are inferior to the filters of the invention in filtration effect.

Since the netlike filter of the present invention is made of glass fibers containing at least 75 wt. % of SiO$_2$, the filter has very high heat resistance and is usable for the melts of various cast irons. When containing at least 90 wt. % of SiO$_2$, the filter is usable also for molten metals, such as molten cast steel, having higher temperatures. Moreover, the present filter is exceedingly superior to the conventional ones in filtration effect. Since the glass fibers are pre-shrunk by thermal cure, the present filter is less prone to deformation while filtering molten metal.

Thus, the netlike filter of the present invention has sufficient resistance to the melts of metals having a high melting point and is more excellent in filtration effect and less costly than the conventional filters.

The netlike filter of the presnt invention is used, for example, in the following modes.

Figure 6:
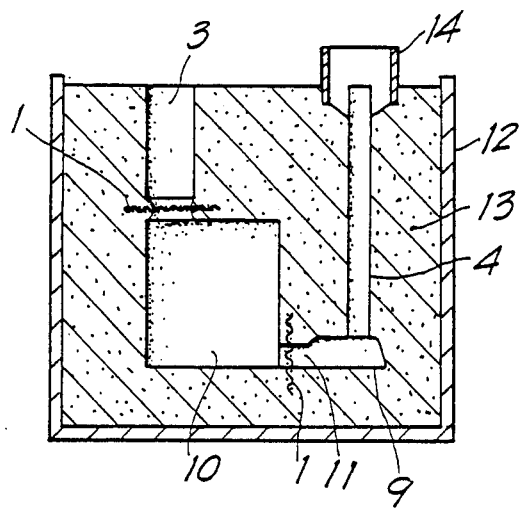
FIG. 6 is a sectional view showing a mold for illustrating an application of the netlike filter of the present invention.

FIG. 6 shows a first mode. Throughout FIGS. 3, 4 and 6, like parts are designated by like reference numerals.

The gating system shown in FIG. 6 comprises a sprue 4, runner 9, gate 11 and riser 3. The gate 11 is provided adjacent to the bottom portion of a mold cavity 10. The sprue 4 is provided at its upper end with a casting frame 14. The riser 3 is adjacent to the upper end of the mold cavity 10.

Netlike filters 1 and 1 are provided at the boundary between the mold cavity 10 and the riser 3 and at the boundary between the mold cavity 10 and the gate 11, respectively. With the filters thus positioned, the molten metal can be filtered effectively, while the casting can be made to have a substantially reduced cross sectional area at the above-mentioned boundaries to result in the advantage that the cast product can be easily separated from the other casting portions formed by the gating system. Since a hammer, cutter or the like is usually used for this separation procedure, use of the present filters achieves a greatly improved work efficiency.

Figure 7:
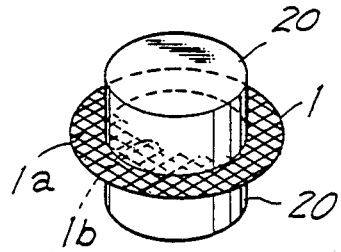
FIG. 7 is a perspective view showing the netlike filter as held between molded members to be lost.
Figure 8:
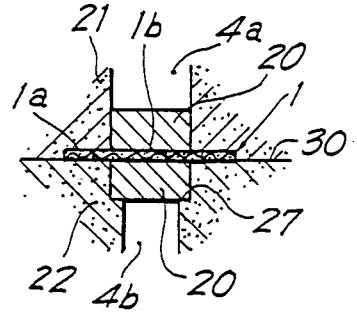
FIG. 8 is a fragmentary sectional view of a mold showing the filter of FIG. 7 as installed in its sprue.
Figure 9:
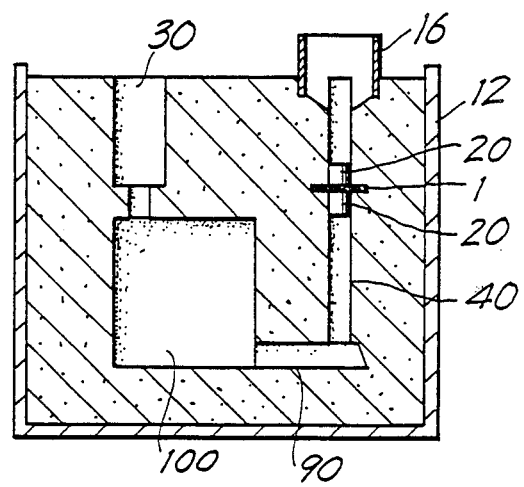
FIG. 9 is a sectional view showing a mold for the "lost-wax" process.

FIGS. 7 to 9 show a second mode of use.

FIG. 7 shows a circular filter 1 which is held at its central portion 1b between a pair of cylindrical molded members 20 and 20, with the outer peripheral portion 1a of the filter exposed and projecting outward from the molded members. The molded members 20, 20 are fittable in the sprue or runner and are made of a pattern material which is to be lost.

The cross section of the molded member 20 is not limited to a circular form but can be square to rectangular or of some other shape insofar as it is fittable in the sprue or runner. The filter 1 can be quadrilateral, hexagonal or shaped otherwise, and the shape thereof can be determined suitably. Examples of useful pattern materials to be lost are foamed styrene, wax, etc.

The filter 1 and the molded members 20 in the form of an assembly can be prepared by placing the netlike filter between the two segments of a dividable mold and pouring the pattern material into the mold.

As seen in FIG. 8, the molded members 20 and 20 are fitted into a sprue portion 4a of an upper mold member 21 and a sprue portion 4b of a lower mold member 22 having a stepped portion 27, respectively, whereby the central portion 1b of the netlike filter 1 can be accurately positioned in the sprue in alignment therewith. With the outer peripheral portion 1a of the filter 1 placed on the parting plane 30, the filter 1 can be held between the upper and lower mold members 21, 22 with good balance.

If the netlike filter 1 has shape retentivity, the molded members 20 and 20 are supportable by the filter against gravity, so that there is no need to provide the stepped portion 27 in the lower mold member 22.

When molten metal is poured into the mold with the filter assembly disposed in the sprue or runner, the mold members disappear on vaporization, leaving the netlike filter only installed in the mold. With the outer peripheral portion of the filter projecting outward from the molded members, the netlike filter can be positioned on the parting plane accurately in alignment with the sprue or runner merely by placing the molded members into the sprue or runner portions adjoining the parting plane.

FIG. 9 shows another arrangement for using the netlike filter 1 having the molded members 20, 20 to be lost. In this example, the filter is used for the "lostwax" process. The patterns shown are made of foamed styrene or the like and include a sprue pattern 40, a runner pattern 90, a product pattern 100 and a riser pattern 30. Indicated at 12 is a metal frame, and at 16 a pouring basin. The patterns are embedded in dry sand.

The netlike filter 1 is provided at an intermediate portion of the sprue pattern 40. Thus, the sprue pattern 40 having the netlike filter 1 can be easily prepared merely by adhering pattern members of suitable length to the outer ends of the molded members 20, 20.

Similarly, the netlike filter can be provided in an intermediate portion of the runner pattern 90.

Figure 11:
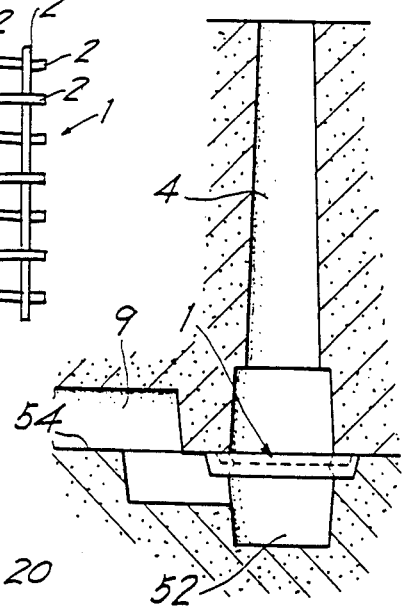
FIG. 11 is a fragmentary sectional view of a mold showing the filter of FIG. 10 as installed in its sprue.
Figure 10:
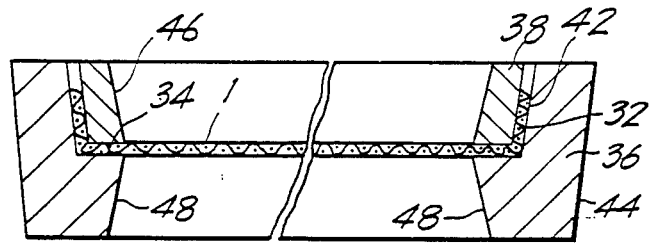
FIG. 10 is a sectional view showing a netlike filter as held between a holding member and a retaining ring.

FIGS. 10 and 11 show a third mode in which the present filter is used.

The filter 1 is circular, and the outer peripheral portion thereof is bent toward the front or rear side of the filter to form a flange 32. A holding member 36 has a radially inwardly projecting annular stepped portion 34, and an upper inner peripheral surface 42 and a lower inner peripheral surface 48 which are continuous with the stepped portion 34. A retaining ring 38 has an outer peripheral surface and a bottom portion which are fittable to the upper surface 42 and the stepped portion 34 of the holding member 36, respectively. Flange 32 may be formed by placing the circular filter on the upper surface of the holding member S0 and then pressing the filter by the retaining ring.

The filter 1 is held between the holding member 36 and the retaining ring 38 as shown in FIG. 10.

To give the holding member 36 a draft for withdrawal after casting, the member 36 has an outer peripheral surface 44 which is tapered downward. The inner peripheral surface 46 of the retaining ring 38 and the lower inner peripheral surface 48 of the holding member 36 are tapered toward the netlike filter. This decreases the diameter of the cast metal portion locally at the filter installed portion. This portion is readily separable because of its notch effect when the cast product is separated from the other cast metal portions.

FIG. 11 shows the above filter assembly as positioned along a parting plane 54 above the bottom 52 of a sprue 4. Indicated at 9 is a runner communicating with a mold cavity.

According to the present embodiment, the filter is held between the holding member 36 and the retaining ring 38 and can therefore be retained in place without any likelihood of slipping off. The filter assembly is economical since the assembly reduces the allowance that would be needed for holding the outer periphery of the filter when the filter is directly installed in the mold. Furthermore, there is no need to conduct the rigidifying treatment for giving shape retentivity to the filter. Thus, the present filter assembly has various advantages.

The present invention is not limited to the foregoing embodiments but various modifications or alterations can of course be made within the technical scope defined in the appended claims.

What is claimed is:

1. A process for producing a filter in the form of a woven net of $SiO_2$-containing glass fibers for filtering molten metal comprising the steps of:
    (a) weaving glass yarns into a netlike filter, each of the glass threads being prepared by bundling and twisting together glass fibers composed cheifly of silica,
    (b) subjecting the netlike filter to an acid treatment to increase the $SiO_2$ content of the glass fibers to at least 75 wt. % and
    (c) thermally curing the resulting filter to contract the pores in the glass fibers until a shrinkage of 2.5 to 15% is obtained, said shrinkage being expressed by $$(1-1')/\times 100 \%$$

wherein l is the length of the fiber before the thermal cure, and l' is the length of the thermally cured fiber.

2. A process as defined in claim 1 wherein the acid treatment is conducted by immersing the netlike filter in an acid solution containing a reaction accelerator.

3. A process as defined in claim 1 wherein the filter is thermally cured at 800° to 1100° C.

4. A process as defined in claim 1 further comprising the step of applying an acid or neutral binder to the glass fibers.

* * * * *